(12) United States Patent
Chila

(10) Patent No.: US 8,307,657 B2
(45) Date of Patent: Nov. 13, 2012

(54) COMBUSTOR LINER COOLING SYSTEM

(75) Inventor: Ronald James Chila, Greer, SC (US)

(73) Assignee: General Electric Company, Schenectady, NY (US)

( * ) Notice: Subject to any disclaimer, the term of this patent is extended or adjusted under 35 U.S.C. 154(b) by 788 days.

(21) Appl. No.: 12/401,530

(22) Filed: Mar. 10, 2009

(65) Prior Publication Data
US 2010/0229564 A1 Sep. 16, 2010

(51) Int. Cl.
F02C 3/14 (2006.01)
(52) U.S. Cl. ........ 60/757; 60/752; 60/754; 60/755; 60/758; 60/760; 431/350; 431/352; 431/353
(58) Field of Classification Search .......... 60/752, 60/754, 755, 757, 758, 760; 431/352, 353, 431/350
See application file for complete search history.

(56) References Cited

U.S. PATENT DOCUMENTS

| 3,608,309 | A | * | 9/1971 | Hill et al. ............... | 60/748 |
|---|---|---|---|---|---|
| 4,109,459 | A | * | 8/1978 | Ekstedt et al. ............ | 60/757 |
| 4,896,510 | A | * | 1/1990 | Foltz ..................... | 60/757 |
| 5,724,816 | A | | 3/1998 | Ritter et al. | |
| 6,098,397 | A | * | 8/2000 | Glezer et al. ............. | 60/772 |
| 6,205,789 | B1 | * | 3/2001 | Patterson et al. ......... | 60/754 |
| 6,237,344 | B1 | * | 5/2001 | Lee ....................... | 60/754 |
| 6,681,578 | B1 | | 1/2004 | Bunker | |
| 6,761,031 | B2 | | 7/2004 | Bunker | |
| 7,007,482 | B2 | | 3/2006 | Green et al. | |
| 7,010,921 | B2 | | 3/2006 | Intile et al. | |
| 7,086,232 | B2 | | 8/2006 | Moertle et al. | |
| 7,096,668 | B2 | | 8/2006 | Martling et al. | |
| 7,104,067 | B2 | | 9/2006 | Bunker | |
| 7,124,588 | B2 | * | 10/2006 | Gerendas et al. .......... | 60/752 |
| 7,216,485 | B2 | * | 5/2007 | Caldwell et al. .......... | 60/772 |
| 7,260,935 | B2 | * | 8/2007 | Colibaba-Evulet et al. ... | 60/748 |
| 7,269,957 | B2 | | 9/2007 | Martling et al. | |
| 7,302,990 | B2 | | 12/2007 | Bunker et al. | |
| 7,386,980 | B2 | | 6/2008 | Green et al. | |
| 8,051,663 | B2 | * | 11/2011 | Tuthill .................. | 60/755 |
| 2007/0245741 | A1 | | 10/2007 | Johnson et al. | |
| 2009/0120096 | A1 | * | 5/2009 | Tuthill .................. | 60/755 |

OTHER PUBLICATIONS

Chila et al., U.S. Appl. No. 12/350,423, filed Jan. 8, 2009.
Chila et al., U.S. Appl. No. 12/398,131, filed Mar. 4, 2009.

* cited by examiner

Primary Examiner — Ehud Gartenberg
Assistant Examiner — Steven Sutherland
(74) Attorney, Agent, or Firm — Fletcher Yoder P.C.

(57) ABSTRACT

A system, in one embodiment, includes a turbine engine. The turbine engine includes a combustor that includes a hollow annular wall having a combustor liner. The turbine engine also includes first flow path in a first direction through the hollow annular wall. The turbine engine further includes a second flow path in a second direction that is opposite the first direction through the hollow annular wall. The second flow path may include one or more film holes configured to supply a cooling film to a downstream end portion of the combustor liner.

23 Claims, 8 Drawing Sheets

COMBUSTOR LINER COOLING SYSTEM

BACKGROUND OF THE INVENTION

The subject matter disclosed herein relates to gas turbine engines and, more specifically, to a system for cooling a combustor liner used in a combustor of a gas turbine engine.

Gas turbine engines typically include a combustor having a combustor liner defining a combustion chamber. Within the combustion chamber, a mixture of compressed air and fuel is combusted to produce hot combustion gases. The combustion gases may flow through the combustion chamber to one or more turbine stages to generate power for driving a load and/or a compressor. Typically, the combustion process heats the combustor liner due to the hot combustion gases. Unfortunately, existing cooling systems may not adequately cool the combustor liner in all conditions.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In one embodiment, a system includes a turbine engine. The turbine engine includes a combustor that includes a hollow annular wall having a combustor liner. The turbine engine also includes first flow path in a first direction through the hollow annular wall. The turbine engine further includes a second flow path in a second direction that is opposite the first direction through the hollow annular wall. The second flow path may include one or more film holes configured to supply a cooling film to a downstream end portion of the combustor liner.

In another embodiment, a system includes a turbine combustor liner. The turbine combustor liner includes a plurality of axial cooling channels arranged circumferentially about a downstream end portion of the turbine combustor liner, the downstream end portion being relative to a downstream direction of combustion along a longitudinal axis of the turbine combustor liner. Each of the plurality of cooling channels includes one or more film holes configured to supply a cooling film to an inner surface of the combustor liner at the downstream end portion.

In yet another embodiment, a method for cooling a turbine combustor liner includes supplying an air flow in a first direction through an annular passage along an outer surface of the turbine combustor liner. The method also includes diverting a portion of the air flow into each of a plurality of cooling channels at a downstream end portion of the turbine combustor liner, such that the flow of air through each of the cooling channels flows in a second direction opposite the first direction, and such that the air flowing through each of the plurality of cooling channels transfers heat away from the liner. The method additionally includes diverting a portion of the air flowing through each of the plurality of cooling channels through one or more film holes within each respective cooling channel to provide an insulating film of cooling air along an inner surface of the turbine combustor liner.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
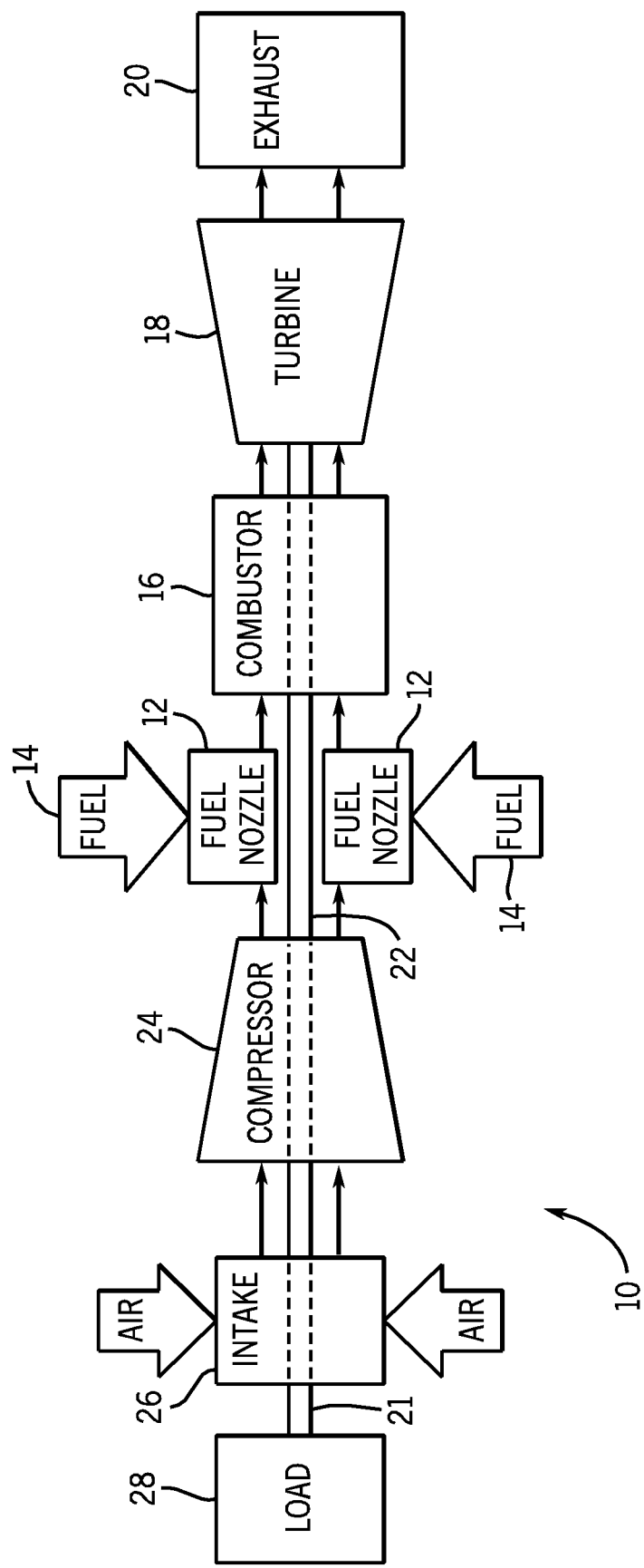
FIG. 1 is a block diagram of a turbine system having a combustor liner having cooling channels for enhanced cooling, in accordance with an embodiment of the present technique.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment" or "an embodiment" of the present invention are not intended to be interpreted as excluding the existence of additional embodiments that also incorporate the recited features.

Before continuing, several terms used extensively throughout the present disclosure will be first defined in order to provide a better understanding of the claimed subject matter. As used herein, the terms "upstream" and "downstream," when discussed in conjunction with a combustor liner, shall be understood to mean the proximal end of the combustor liner and the distal end of the combustor liner, respectively, with respect to the fuel nozzles. That is, unless otherwise indicated, the terms "upstream" and "downstream" are generally used with respect to the flow of combustion gases inside the combustor liner. For example, a "downstream" direction refers to the direction in which a fuel-air mixture combusts and flows from the fuel nozzles towards a turbine and an "upstream" direction refers to a direction opposite the downstream direction, as defined above. Additionally, the term "downstream end portion," "coupling portion," or the like, shall be understood to refer to an aft-most (downstream most) portion of the combustor liner. As will be discussed further below, the axial length of the downstream end portion of the combustor liner, in certain embodiments, may be as much as approximately 20 percent the total axial length of the combustor liner. The downstream end portion (or coupling portion), in some embodiments, may also be understood to be the portion of the liner that is generally configured to couple to a downstream transition piece of the combustor, generally in a telescoping, concentric, or coaxial overlapping annular relationship. Further, where the term "liner" appears alone, it should be understood that this term is generally synonymous with "combustor liner."

Keeping in mind the above-defined terms, the present disclosure is generally directed towards a combustor liner capable of providing more effective cooling during the operation of a turbine engine. In one embodiment, the liner has a downstream end portion that includes a plurality of channels (also referred to herein as "cooling channels") arranged circumferentially about the outer surface of the downstream end portion. The channels may define a flow path that is parallel to the longitudinal axis of the liner. Further, each channel may each include one or more openings that fluidly couple the channel to the combustion chamber. While certain embodiments will refer to these openings as "film holes," it should be understood that the openings may include holes, slots, or a combination of holes and slots, and may be formed using any suitable technique, such as laser drilling, for example.

In operation, an annular wrapper having a plurality of openings extending radially therethrough may be coupled to the liner generally about the downstream end portion. The inner surface of the wrapper and the cooling channels on the downstream end portion may define one or more passages through which an air flow may be supplied via one or more openings on the wrapper. The air flow may be a portion of the compressed air supplied to the combustor for combustion of fuel. As the air flows through a cooling channel, heat may be transferred away from the combustor liner, particularly the downstream end portion of the liner, via forced air convention. Additionally, a portion of the air flow within the cooling channel may flow through the film holes and into the combustion chamber to provide a film of cooling air which insulates the liner, particularly the downstream end portion of the liner, from the relatively hotter combustion gases within the combustor, thereby cooling the liner via film cooling.

In some embodiments, the liner may further include a plurality of "bypass openings" in addition to the film holes discussed above. The bypass openings may be located upstream from the cooling channels and may extend radially through the combustor liner. The bypass openings may provide a direct flow path into the combustion chamber (e.g., interior of the combustor liner) that bypasses the cooling channels discussed above. Air may flow into the combustion chamber along this path, thus providing an additional cooling film along the interior of the surface of the combustor liner upstream from the cooling film provided via the film holes, thereby further insulating the liner from combustion gases within the liner. In this manner, embodiments of the present invention may provide for enhanced heat transfer using forced convection and film cooling principles simultaneously. Advantageously, this may improve overall turbine performance and increase the life of the combustor and/or combustor liner.

Turning now to the drawings and referring first to FIG. 1, a block diagram of an embodiment of a turbine system 10 is illustrated. As discussed in detail below, the disclosed turbine system 10 may employ a combustor liner having cooling channels formed on a downstream end portion of the liner. The cooling channels may include film holes that provide for improved cooling of the downstream end portion, as will be discussed further below. The turbine system 10 may use liquid or gas fuel, such as natural gas and/or a hydrogen rich synthetic gas, to run the turbine system 10. As depicted, a plurality of fuel nozzles 12 intakes a fuel supply 14, mixes the fuel with air, and distributes the air-fuel mixture into a combustor 16. The air-fuel mixture combusts in a chamber within combustor 16, thereby creating hot pressurized exhaust gases. The combustor 16 directs the exhaust gases through a turbine 18 toward an exhaust outlet 20. As the exhaust gases pass through the turbine 18, the gases force one or more turbine blades to rotate a shaft 22 along an axis of the system 10. As illustrated, the shaft 22 may be connected to various components of turbine system 10, including a compressor 24. The compressor 24 also includes blades that may be coupled to the shaft 22. As the shaft 22 rotates, the blades within the compressor 24 also rotate, thereby compressing air from an air intake 26 through the compressor 24 and into the fuel nozzles 12 and/or combustor 16. The shaft 22 may also be connected to a load 28, which may be a vehicle or a stationary load, such as an electrical generator in a power plant or a propeller on an aircraft, for example. As will be understood, the load 28 may include any suitable device that capable of being powered by the rotational output of turbine system 10.

Figure 2:
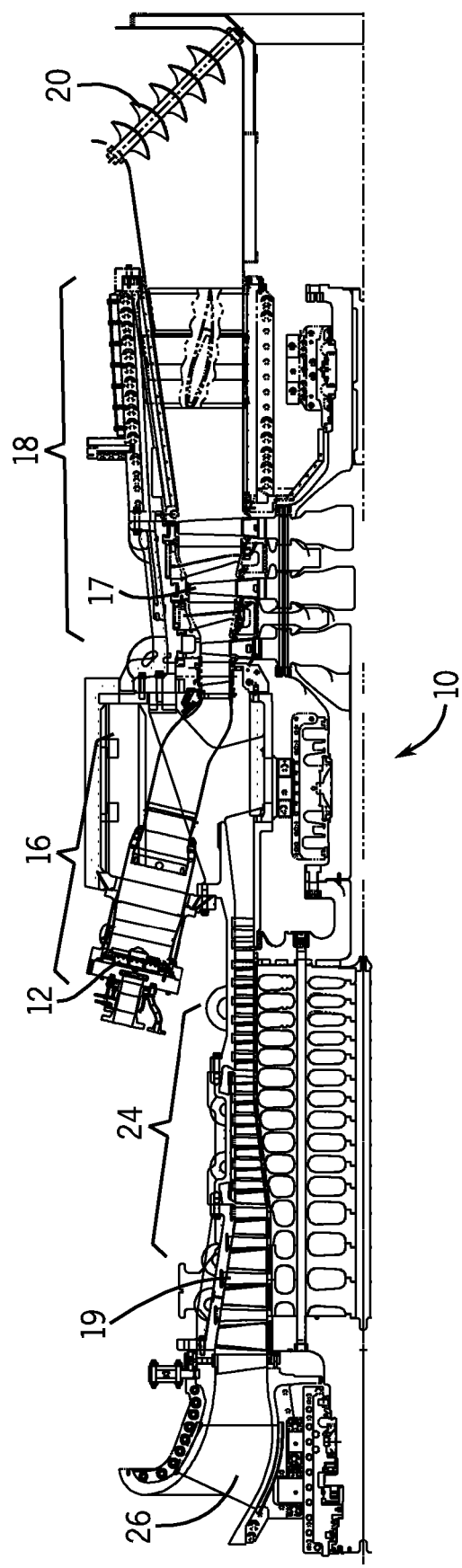
FIG. 2 is a cutaway side view of the turbine system, as shown in FIG. 1, in accordance with an embodiment of the present technique.

FIG. 2 illustrates a cutaway side view of an embodiment of the turbine system 10 schematically depicted in FIG. 1. The turbine system 10 includes one or more fuel nozzles 12 located inside one or more combustors 16. The combustor 16 may include one or more combustor liners disposed within one or more respective flow sleeves. As mentioned above, the combustor liner (or liners) may include a plurality of cooling channels formed on a downstream end portion of the liner. Each cooling channel may also include openings, such as film holes, which fluidly couple the cooling channel to the combustion chamber defined by the liner.

In operation, air enters the turbine system 10 through the air intake 26 and may be pressurized in the compressor 24. The compressed air may then be mixed with gas for combustion within combustor 16. For example, the fuel nozzles 12 may inject a fuel-air mixture into the combustor 16 in a suitable ratio for optimal combustion, emissions, fuel consumption, and power output. The combustion generates hot pressurized exhaust gases, which then drive one or more blades 17 within the turbine 18 to rotate the shaft 22 and, thus, the compressor 24 and the load 28. The rotation of the turbine blades 17 causes a rotation of shaft the 22, thereby causing blades 19 within the compressor 22 to draw in and pressurize the air received by the intake 26.

As will be discussed in further detail below, each of the cooling channels on the downstream end portion of the combustor liner may receive a portion of the air supplied to the combustor 16 through the air intake 26. In one embodiment, the total air supplied to the cooling channels may make up approximately 2% of the total air supplied to the combustor 16 via compressor 24 and intake 26. As the compressor-supplied air (which is generally substantially cooler relative to the combustion gases within the combustor 16) flows through the cooling channels, heat is transferred away from the downstream end portion of the liner (e.g., via forced convection cooling). Further, a portion of the airflow within each cooling channels may flow through the film holes and form a cooling film along a portion of the inner surface of the liner. The cooling film insulates the liner from the relatively hot combustion gases flowing within the combustor 16. Thus, in operation, cooling of the liner, particularly the downstream end portion of the liner, is enhanced by utilizing both forced convection and film cooling techniques.

Figure 3:
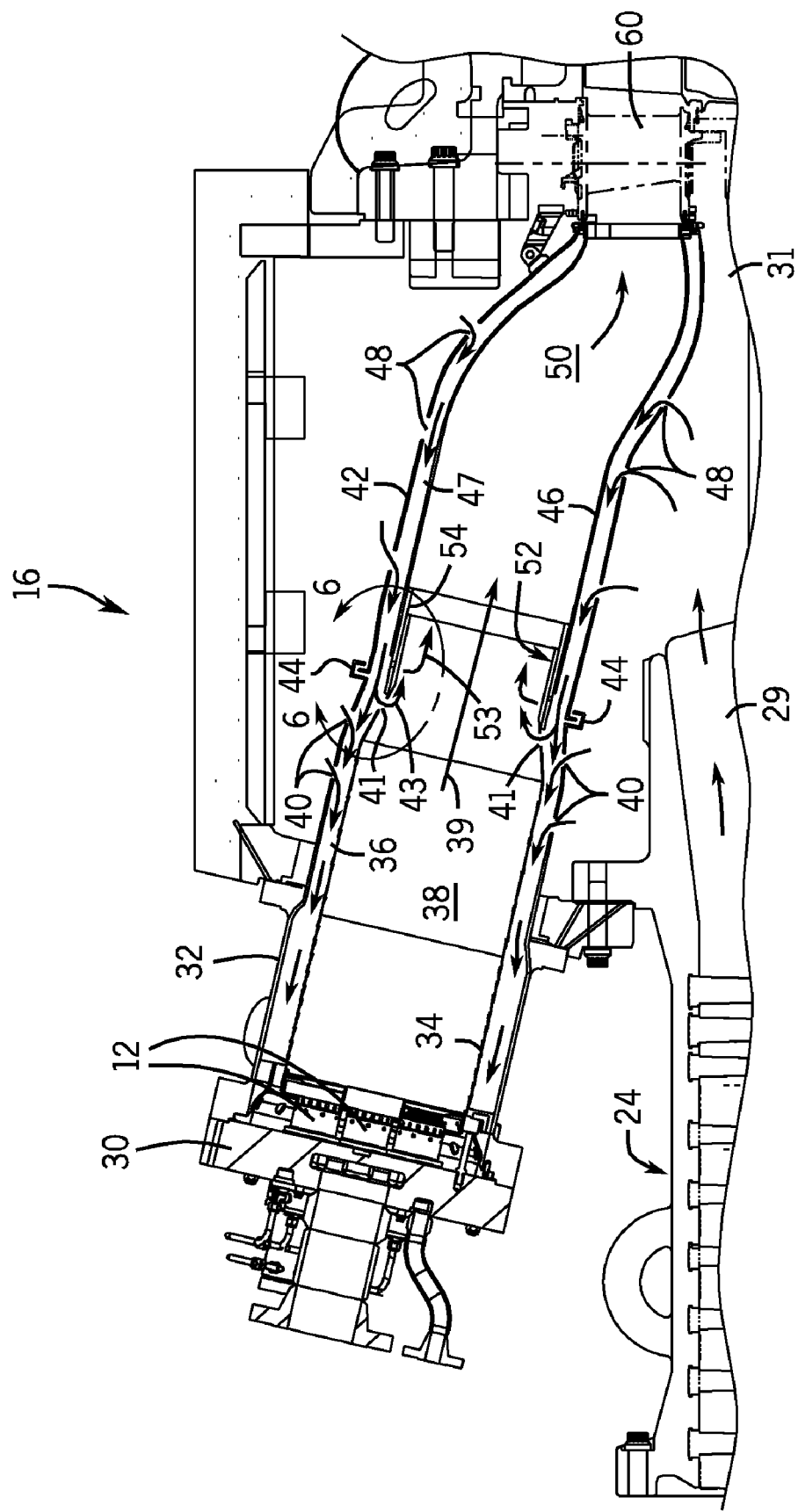
FIG. 3 is a cutaway side view of the combustor, as shown in FIG. 1, having a combustor liner with cooling channels at a downstream end portion, in accordance with an embodiment of the present technique.

Continuing now to FIG. 3, a more detailed cutaway side view of an embodiment of the combustor 16, as shown FIG. 2, is illustrated. As will be appreciated, the combustor 16 is generally fluidly coupled to the compressor 24 and the turbine 18. The compressor 24 may include a diffuser 29 and a discharge plenum 31 that are coupled to each other in fluid communication as to facilitate the channeling of air downstream to the combustor 16. In the illustrated embodiment, the combustor 16 includes a cover plate 30 at the upstream head end of the combustor 16. The cover plate 30 may at least partially support the fuel nozzles 12 and provide a path through which air and fuel are directed to the fuel nozzles 12.

The illustrated combustor 16 comprises a hollow annular wall configured to facilitate cooling air flow. For example, the combustor 16 includes a combustor liner 34 disposed within a flow sleeve 32. The arrangement of the liner 34 and the flow sleeve 32, as shown in FIG. 3, is generally concentric and may define an annular passage 36. In certain embodiments, the flow sleeve 32 and the liner 34 may define a first or upstream hollow annular wall of the combustor 16. The interior of the liner 34 may define a substantially cylindrical or annular combustion chamber 38. The flow sleeve 32 may include a plurality of inlets 40, which provide a flow path for at least a portion of the air from the compressor 24 into the annular passage 36. In other words, the flow sleeve 32 may be perforated with a pattern of openings to define a perforated annular wall.

Downstream from the liner 34 and the flow sleeve 32 (e.g. in the direction 39), a second flow sleeve 42, which may be referred to as an "impingement sleeve," may be coupled to the flow sleeve 32. Thus, the direction 39 may represent a downstream direction with respect to the flow of combustion gases away from the fuel nozzles 12 inside the liner 34. As used herein, the terms "upstream" and "downstream," when discussed in conjunction with a combustor liner, shall be understood to mean the proximal end of the combustor liner and the distal end of the combustor liner 34, respectively, with respect to the fuel nozzles 12. That is, unless otherwise indicated, the terms "upstream" and "downstream" are generally used with respect to the flow of combustion gases inside the combustor liner. For example, a "downstream" direction refers to the direction 39 in which a fuel-air mixture combusts and flows from the fuel nozzles 12 towards the turbine 18, and an "upstream" direction refers to a direction opposite the downstream direction, as defined above.

In the present embodiment, the flow sleeve 32 may include a mounting flange 44 configured to receive a portion of the impingement sleeve 42. A transition piece 46 (which may be referred to as a "transition duct") may be disposed within the impingement sleeve 42. A concentric arrangement of the impingement sleeve 42 and the transition piece 46 may define an annular passage 47. As shown, the annular passage 47 is fluidly coupled to the annular passage 36. In certain embodiments, the sleeve 42 and the transition piece 46 may define a second or downstream hollow annular wall of the combustor 16. Thus, together, the elements 32, 34, 42, and 46 define a hollow annular wall (e.g., upstream and downstream portions) configured to facilitate air flow to the fuel nozzles 12, while also cooling the combustor 16 due to the heat generated from combustion.

The impingement sleeve 42 may include a plurality of inlets 48 (e.g., perforated annular wall), which may provide a flow path for at least a portion of the air from the compressor 24 into the annular passage 47. An interior cavity 50 of the transition piece 46 generally provides a path by which combustion gases from the combustion chamber 38 may be directed thru a turbine nozzle 60 and into the turbine 18. In the depicted embodiment, the transition piece 46 may be coupled to the downstream end of the liner 34 (with respect to direction 39), generally about a downstream end portion 52 (coupling portion), as discussed above. An annular wrapper 54 and a seal may be disposed between the downstream end portion 52 and the transition piece 46. The seal may secure the outer surface of the wrapper 54 to inner surface of the transition piece 46. Further, as mentioned above, the inner surface of the wrapper 54 and the cooling channels on the downstream end portion may define passages that receive a portion of the air flow from the annular passage 47.

As discussed above, the turbine system 10, in operation, may intake air through the air intake 26. The compressor 24, which is driven by the shaft 22, rotates and compresses the air. The compressed air is discharged into the diffuser 29, as indicated by the arrows shown in FIG. 3. The majority of the compressed air is further discharged from the compressor 24, by way of the diffuser 29, through a plenum 31 into the combustor 16. Though not shown in detail here, a smaller portion of the compressed air may be channeled downstream for cooling of other components of the turbine engine 10. A portion of the compressed air within the plenum 31 may enter the annular passage 47 by way of the inlets 48. The air in the annular passage 47 is then channeled upstream (e.g., in the direction of fuel nozzles 12) towards the annular passage 36, such that the air flows over the downstream end portion 52 of the liner 34. That is, a flow path in the upstream direction (relative to direction 39) is defined by the annular passages 36 (formed by sleeve 32 and liner 34) and 47 (formed by sleeve 42 and transition piece 46). A portion of the air flowing in the upstream direction is diverted into the cooling channels on the downstream end portion of the liner 34 to facilitate cooling. In one embodiment, a plurality of inlets on the wrapper 54 may provide a flow path into the cooling channels. As mentioned above, air flowing through the channel may cool the liner 34 via forced convection cooling. Additionally, a portion of the airflow within the channel may be diverted through one or more film holes within the channel and into the combustion chamber 38, as indicated by the air flow 53. The air flow 53 may form a cooling film that insulates the downstream end portion 52 of the liner 34 from the hot combustion gases within the chamber 38.

The portion of the air flow that is not discharged into the cooling channel continues to flow upstream into the annular passage 36 toward the cover plate 30 and fuel nozzles 12.

Accordingly, the annular passage 36 may receive air from the annular passage 47 and the inlets 40. As shown in FIG. 3, a portion of the air flow within the annular passage 36 may be directed into one or more bypass openings 41 on the liner 34. The bypass openings 41 extend radially through the liner 34 and provide a direct flow path into the combustion chamber 38 that bypasses the cooling channels on the downstream end portion 52. The air 43 that flows into the combustion chamber 38 through the bypass openings 41 may provide an additional cooling film along the inner surface of the liner 34 upstream from the cooling film provide via film holes within the cooling channels, thus providing additional insulation for the liner 34. The remaining air flowing into the annular passage 36 is then channeled upstream towards the fuel nozzles 12, wherein the air is mixed with fuel 14 and ignited within the combustion chamber 38. The resulting combustion gases are channeled from the chamber 38 into the transition piece cavity 50 and through the turbine nozzle 60 to the turbine 18.

Figure 4:
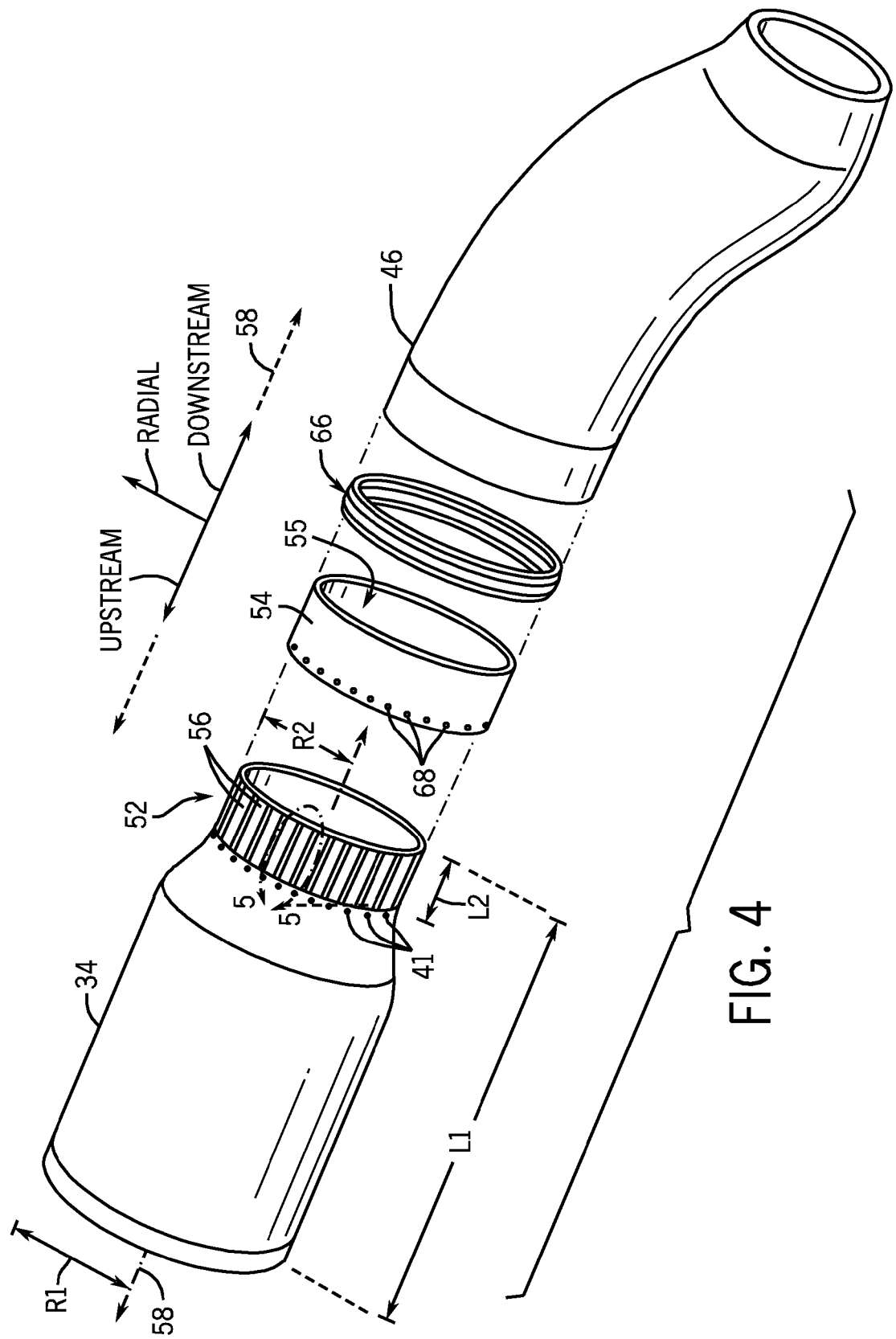
FIG. 4 is an exploded perspective view of certain components of the combustor, as shown in FIG. 3, in accordance with an embodiment of the present technique.

FIG. 4 is an exploded perspective view showing some of the above-discussed components of the combustor 16. Particularly, FIG. 4 is intended to provide a better understanding of the relationship between the liner 34, the wrapper 54, and the transition piece 46. As shown, the liner 34 may have a length of L1 when measured along a longitudinal axis, referred to here by reference number 58. In the illustrated embodiment, a radius R1 of the upstream end of the liner 34 may be greater than a radius R2 of the downstream end of the liner 34. In other embodiments, however, the radii R1 and R2 may be equal or the radius R2 may be greater than the radius R1. The liner 34 includes the downstream end portion 52. As discussed above, the downstream end portion 52 is a portion of the liner having an axial length L2 which, when measured from the downstream (aft-most) end of the liner 34, is less than the total length L1 of the liner 34. In one embodiment, the length L2 of the downstream end portion 52 may be approximately 10-20 percent of the total length L1 of the liner. However, it should be appreciated that in other embodiments, depending on implementation specific goals, the length L2 could be greater than 20 percent or less than 10 percent of L1. For example, in other embodiments, the longitudinal length L2 of the downstream end portion 52 may be at least less than approximately 5, 10, 15, 20, 25, 30, or 35 percent of the total length L1.

The wrapper 54 is configured to mate with the liner 34 generally about the downstream end portion 52 in a telescoping, coaxial, or concentric overlapping relationship. The transition piece 46 is coupled to the liner 34 generally about the downstream end portion 52 and the wrapper 54. A sealing ring 66 may be disposed between the wrapper 54 and the transition piece 46 to facilitate the coupling. As shown, the wrapper 54 may include a plurality of inlets 68 generally near the upstream end of the wrapper 54. In the illustrated embodiment, the inlets 68 are depicted as a plurality of openings disposed circumferentially (relative to the axis 58) about the upstream end of the wrapper 54 and also extending radially therethrough. The openings defined by the inlets 68 may include holes, slots, or a combination of holes and slots, for example. An inner surface 55 of the wrapper 54 and the cooling channels 56 on the downstream end portion 52 may form passages to receive an air flow provided via the inlets 68. By way of example, in one embodiment, each inlet 68 may supply an air flow (e.g., divert a portion of the air flowing upstream towards the fuel nozzles 12 through annular passages 36 and 47) to a respective cooling channel 56 on the downstream end portion 52. As the air (which is substantially cooler relative to the temperature of the combustion gases within the combustion chamber 38) flows into and through the channels 56, heat is transferred away from the liner 34, thus cooling the liner 34. Additionally, as discussed above, one or more of the channels 56 may include film holes fluidly coupling the channel 56 to the combustion chamber 38. A portion of the air flow within the channel 56 may be diverted low through the film holes to provide a cooling film that insulates the inner surface of the liner 34 from the combustion gases in the chamber 38. The liner 34 also includes the bypass openings 41 which, as discussed above, may provide an additional cooling film along the inner surface of the liner 34, thus providing additional insulation for the liner 34.

Figure 5:
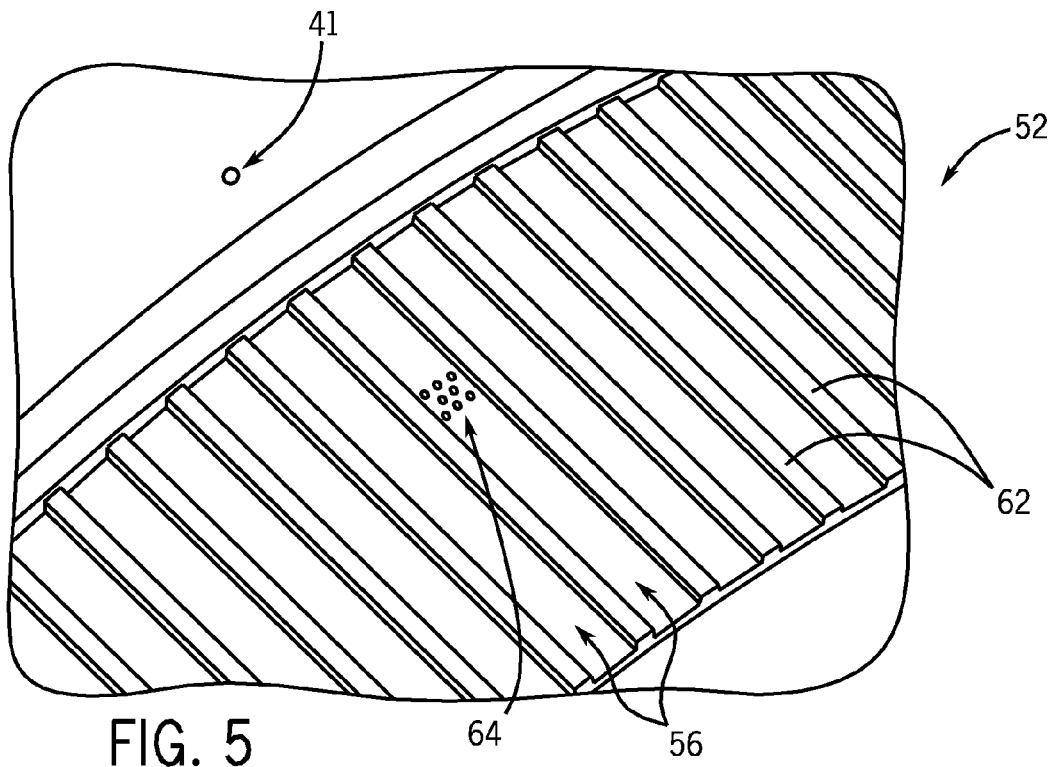
FIG. 5 is a partial perspective view of a portion of the cooling channels on the downstream end portion of the combustor liner, taken within line 5-5 as shown in FIG. 4, in accordance with an embodiment of the present technique.

FIG. 5 is a partial perspective view showing the cooling channels 56 on the downstream end portion 52 of the liner 34 within the circular region defined by the arcuate line 5-5, as shown in FIG. 4. As shown in the depicted embodiment, a plurality of axial cooling channels 56 are arranged circumferentially about the downstream end portion 52 of the liner 34. The channels 56 may define flow paths generally parallel to one another and the longitudinal axis 58 of the liner 34. In one embodiment, the channels 56 may be formed by removing a portion of the outer surface of the downstream end portion 52, such that each cooling channel 56 is a recessed groove between adjacent raised dividing members 62. Thus, the cooling channels 56 may be defined by alternating axial grooves and axial protrusions (e.g., 62) about a circumference of the combustor liner 34. As will be appreciated, the channels 56 may be formed using any suitable technique, including milling, casting, molding, or laser etching/cutting, for example. The cooling channels 56, in one embodiment, may have an axial length (with respect to axis 58) that is substantially equivalent to the axial length L2 of the downstream end portion 52, as discussed above. In other embodiments, the cooling channels 56 may have an axial length that is less than L2. By way of example only, the axial length of each cooling channel 56 may be at least less than approximately 3, 4, 5, 6, 7, or 8 inches. In other embodiments, however, the axial length of the cooling channels 56 may be less than 3 inches or greater than 8 inches. The cooling channels may also have various depths and widths. In one embodiment, the cooling channels may have a width of at least less than approximately 0.25 inches, 0.5 inches, 0.75 inches, or 1 inch. In other embodiments, the width may be less than 0.25 inches or greater than 1 inch. Further, in one embodiment, the depth of the cooling channels 56 may be at least less than approximately 0.05 inches, 0.10 inches, 0.15 inches, 0.20 inches, 0.25 inches, or 0.30 inches. In further embodiments, the depth of the cooling channels 56 may be less than 0.05 inches or greater than 0.30 inches.

The film holes 64 extend radially through the axial grooves into an interior of the combustor liner 34. In certain embodiments, the film holes 64 may be arranged in a group, as shown in FIG. 5, at a particular axial position along each cooling channel 56. For example, the film holes 64 may include between approximately 1 and 20 or 1 and 10 openings in a group, which may be disposed at an axial position of approximately 20, 40, 60, or 80 percent of the length L2 of the cooling channel 56 relative to the downstream end. In some embodiments, the film holes 64 may be disposed at multiple axial positions, equally or non-equally spaced relative to one another, along the length L2 of the channels 56. In the present figure, film holes 64 are shown in only one channel 56 for purposes of simplicity. It should be appreciated that in an actual implementation, similar arrangements of the illustrated film holes 64 may be provided in more than one cooling channel 56 on the downstream end portion 52 (e.g., each cooling channel 56 may include film holes 64 in one or more locations).

As discussed above, the film holes 64 fluidly couple the channels 56 to the combustion chamber 38 and may provide an insulating film of cooling air along the inner surface of the liner 34. In one embodiment, the film holes 64 may have a diameter of at least less than approximately 0.01, 0.02, 0.03, 0.04, 0.05, 0.06, 0.07, 0.08, 0.09, or 0.10 inches. In other embodiments, the film holes 64 may be less than 0.01 inches or greater than 0.10 inches. FIG. 5 also shows the bypass openings 41 located upstream from the cooling channels 56. As discussed above, the bypass openings 41 may provide a flow of air directly into the combustion chamber 38 (e.g., bypassing the cooling channels 56), thus providing an additional cooling film along the inner surface of the liner 34, thereby further enhancing cooling of the liner 34. In one embodiment, the bypass openings 41 may have dimensions similar to the film holes 64, as discussed above. That is, the bypass openings 41, in one embodiment, may have a diameter of at least less than approximately 0.01, 0.02, 0.03, 0.04, 0.05, 0.06, 0.07, 0.08, 0.09, or 0.10 inches or, in other embodiments, less than 0.01 inches or greater than 0.10 inches. As will be appreciated, the presently illustrated embodiment is only intended by provide an example of a particular implementation that utilizes both the film holes 64 and bypass openings 41 to cool the liner 34 via film cooling and forced convection cooling. In another embodiment, the liner 34 may include only the film holes 64 and not the bypass openings 41.

Figure 6:
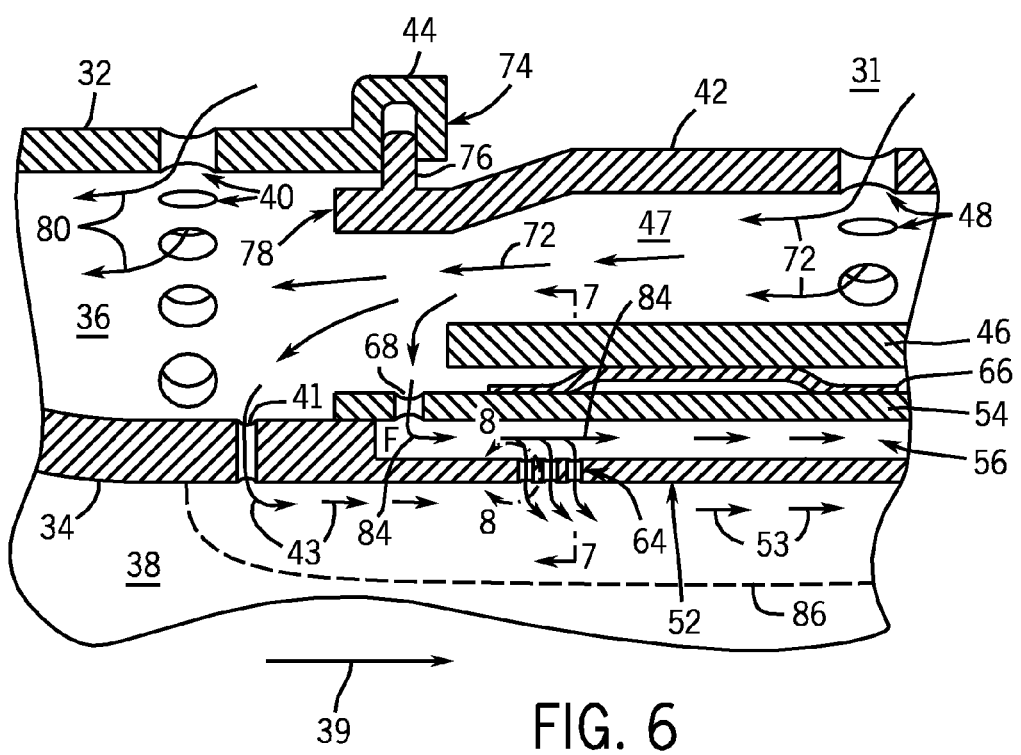
FIG. 6 is a partial cross-sectional side view of the downstream end portion of the combustor liner, taken within line 6-6 as shown in FIG. 3, in accordance with an embodiment of the present technique.

Referring now to FIG. 6, a partial cross-sectional side view of the combustor 16 within the circular region defined by the arcuate line 6-6 in FIG. 3 is illustrated. Particularly, FIG. 6 shows in more detail the air flow into the cooling channels 56 on downstream end portion 52 of the liner 34. Compressed air discharged by the compressor 24 may be received in the annular passage 47 (defined by the impingement sleeve 42 and the transition piece 46) through the inlets 48. In the present embodiment, the inlets 48 are circular-shaped holes, although in other implementations, the inlets 48 may be slots, or a combination of holes and slots of other geometries. As the air 72 within the annular passage 47 is channeled upstream relative to the direction of the combustion gas flow (e.g., direction 39), the majority of the air 72 is discharged into the annular passage 36 (defined by the flow sleeve 32 and the liner 34). As discussed above, the flow sleeve 32 may include the mounting flange 44 at a downstream end 74 configured to receive a member 76 extending radially outward from the upstream end 78 of the impingement sleeve 42, thereby fluidly coupling the flow sleeve 32 and impingement sleeve 42. In addition to receiving the air flow 72 from the annular passage 47, the annular passage 36 also receives a portion 80 of the compressed air from the plenum 31 by way of the inlets 40. That is, the airflow within the annular passage 36 may include air 72 discharged from the annular passage 47 and air 80 flowing through the inlets 40. Thus, a flow path that is directed upstream (with respect to the direction 39) is defined by the annular passages 36 and 47. Additionally, it should be understood that like the inlets 48 on the impingement sleeve 42, the inlets 40 may also include holes, slots, or a combination thereof, of various shapes.

While a majority of the air 72 flowing through the annular passage 47 is discharged into the annular passage 36, a portion of the air flow, shown here by the reference number 84, may be directed into the cooling channels 56 on the downstream end portion 52 by way of a flow path F provided by the plurality of inlets 68 on the wrapper 54. The flow path F may define an air flow through the cooling channels 56. As shown, the flow path F is directed downstream with respect to direction 39, and is opposite of the flow path through the annular passages 36 and 47. Though only one cooling channel 56 is shown in the cross-sectional view of FIG. 6, it should be understood that a similar air flow scheme may be applied to each of the cooling channels 56 on the downstream end portion 52. In one embodiment, the total air flow directed into and through the cooling channels 56 about the downstream end portion 52 may represent at least less than approximately 1, 2, 3, 4, 5, 6, 7, 8, 9, or 10 percent of the total compressed air supplied to the combustor 16. In other embodiments, the total air directed into the cooling channels 56 may be more than 10 percent of the total compressed air supplied to the combustor 16.

As discussed above, the air 84 that flows into the depicted cooling channel 56 is generally substantially cooler relative to the temperature of the combustion gases within the combustion chamber 38. Thus, as the air 84 flows through the cooling channels 56 along the flow path F, heat may be transferred away from the combustor liner 34, particularly the downstream end portion 52 of the liner. By way of example, the mechanism employed in cooling the liner 34 may be forced convective heat transfer resulting from the contact between the cooling air 84 and the outer surface of downstream end portion 52, which may include the grooves and dividing members 62 defining the channels 56, as discussed above with reference to FIG. 5. The flow path F may continue along the axial length of the cooling channel 56, wherein the cooling air 84 exits the cooling channel 56 at a downstream end (not shown), thereby discharging into the transition piece cavity 50, whereby the cooling air 84 is directed towards combustion gases flowing downstream (away from the fuel nozzles 12) through the transition piece cavity 50.

As shown in the present embodiment, a portion 53 of the cooling air 84 may flow through the film holes 64 within the cooling channel 56 and into the combustion chamber 38. The air 53 may provide a cooling film 86 that insulates the liner 34 from the combustion gases within the chamber 38, as discussed above. The depicted cooling film 86 may also include the air flow 43, which may be provided through the bypass openings 41 on the liner 34. Thus, air directed through the film holes 64 and the bypass openings 41 may both contribute to the formation of the cooling film 86.

Figure 7A:
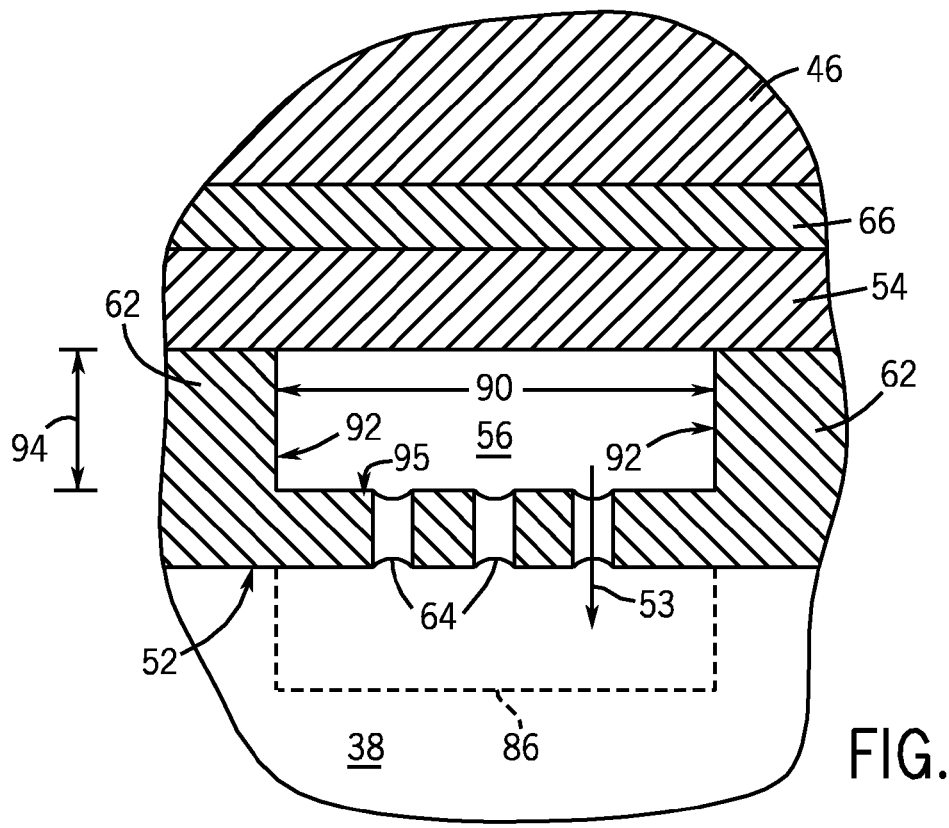
FIGS. 7A and 7B are partial cross-sectional end views of a cooling channel within the downstream end portion of the combustor liner, taken along line 7-7 as shown in FIG. 6, in accordance with embodiments of the present technique.
Figure 7B:
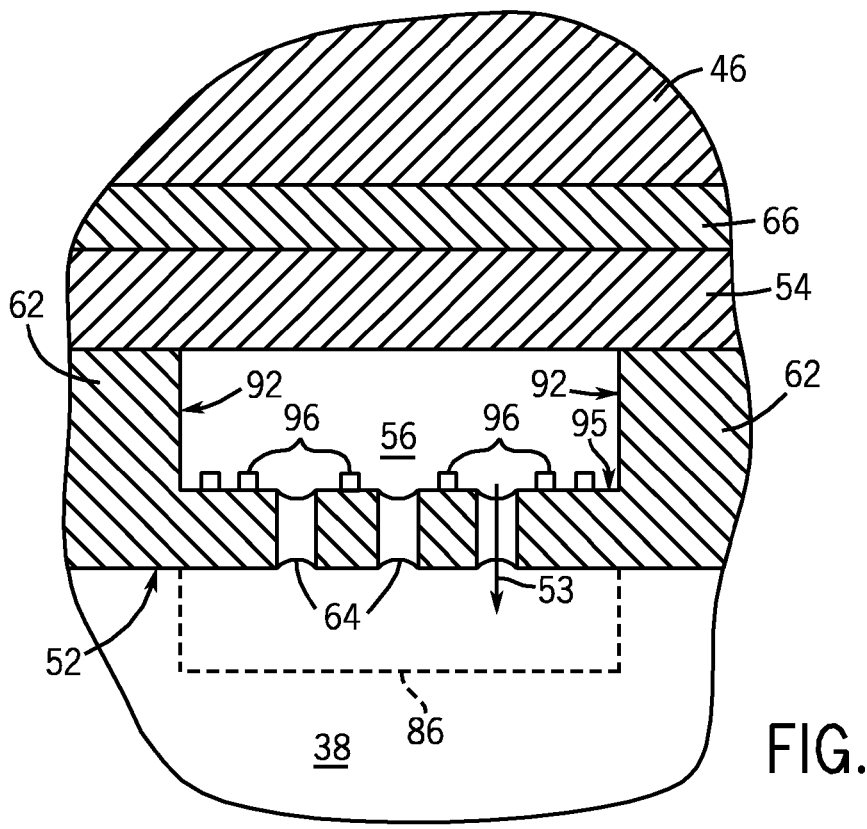

Referring now to FIGS. 7A and 7B, cross-sectional end views of the cooling channel 56 with respect to the cut line 7-7 of FIG. 6 are illustrated in accordance with embodiments of the invention. Referring first to FIG. 7A, the transition piece 46, seal 66, wrapper 54, and downstream end portion 52 of the liner 34 are shown in the arrangement described above. As discussed, the cooling channels 56 may be formed by removing a portion of the liner 34 to define a groove between dividing members 62. In the illustrated embodiment, the dividing members 62 may have a height 94 of approximately at least less than approximately 0.05 inches, 0.10 inches, 0.15 inches, 0.20 inches, 0.25 inches, or 0.30 inches, which may corresponding to the depth of the cooling channel 56, as mentioned above. In further embodiments, the height 94 of the dividing members 62 may be less than 0.05 inches or greater than 0.30 inches. Additionally, the width 90 of the cooling channel 56 may be defined as a circumferential distance between the sidewalls 92 of two adjacent dividing members 62. As discussed above, in one embodiment, the width 90 (e.g., circumferential width) of each cooling channel 56 may be at least less than approximately 0.25 inches, 0.5 inches, 0.75 inches, or 1 inch. In other embodiments, the width 90 may be less than 0.25 inches or greater than 1 inch.

In the depicted embodiment, the cooling channel 56 may have a substantially flat and/or smooth surface 95. For example, the surface 95 may be flat in the axial and/or circumferential directions, or the surface 95 may have a slight curvature in the circumferential direction due to the annular shape of the liner 34. By further example, the surface 95 may be substantially or entirely free of protrusions, recesses, or surface texture except for the film holes 64. As cooling air (e.g., air 84) flows through the channel 56 in the downstream direction 39 (i.e., perpendicular to the page) and contacts the surface 95 and sidewalls 92, heat may be transferred away from the liner 34, particularly the downstream end portion 52 of the liner 34, via forced convection cooling. Additionally, as mentioned above, a portion 53 of the cooling air 84 may flow through one or more film holes 64 that extend radially through the channel 56 and fluidly couple the channel 56 to the combustion chamber 38. As the air 53 flows through the film holes 64 and into the chamber 38, a cooling film 86 is formed. As discussed above, the cooling film 86 may insulate the liner 34 from the hot combustion gases within the chamber 38.

While the present view depicted by FIG. 7A shows three film holes 64 distributed circumferentially across the width 90 of the cooling channel 56, it should be understood that this is meant to provide merely one example of how the film holes 64 may be arranged within the channel 56. Indeed, any other suitable arrangement of film holes 64 may be employed. For instance, a plurality of film holes 64 may be arranged in both circumferential and axial directions within the cooling channel 56. Further, as will be discussed further below with respect to FIG. 9, in some embodiments, the film holes 64 may be arranged in a plurality of groups axially spaced along the axial length of the cooling channel 56.

Referring to FIG. 7B, an alternate embodiment of the cooling channel 56 is illustrated. In contrast to the flat and/or smooth surface 95 shown in FIG. 7A, the surface 95 of the embodiment depicted in FIG. 7B may include a plurality of surface features 96, which may be discrete protrusions extending from the surface 95. By way of example, the surface features may include fin-shaped protrusions, cylindrical-shaped protrusions, ring-shaped protrusions, chevron-shaped protrusions, raised portions between cross-hatched grooves formed with in the cooling channel 56, or some combination thereof, as well as any other type of suitable geometric shape. It should be appreciated that the dimensions of the surface features 96 may be selected to optimize cooling while satisfying the geometric constraints of the cooling channels 56 (e.g., based upon the cooling channel dimensions discussed above).

The surface features 96 may further enhance the forced convective cooling of the liner 34 by increasing the surface area of the downstream end portion 52 via which the cooling air 84 may contact as it flows through the channel 56. Thus, in the present embodiment, as the air 84 flows through the channel 56 and contacts the surface features 96, the amount of heat transferred away from the liner 34 may be greater relative to the embodiment shown in FIG. 7A, in which the cooling channel 56 has a substantially flat and/or smooth surface 95. Further, while the presently illustrated embodiments show surface features 96 formed only on the surface 95, in other embodiments, the surface features 96 may also be formed on the sidewalls 92 of the channel 56.

Continuing now to FIGS. 8A-8D, cross-sectional side views of the cooling channel 56 within the circular region defined by the arcuate line 8-8 in FIG. 6 is illustrated. Particularly, FIGS. 8A-8D illustrate several shapes in which the film holes 64 may be formed, in accordance with embodiments of the present invention. For instance, referring to the embodiment shown in FIG. 8A, a film hole 64 extending through the downstream end portion 52 within the cooling channel 56 may include edges 104 that are parallel to each other and perpendicular to the longitudinal axis 58 of the liner 34. In other words, the edges 104 of the film hole 64 may define a straight cylindrical passage with an angle of approximately 90 degrees relative to the inner and outer surfaces of the liner 34. Thus, the outer opening 100 (adjacent to the cooling channel 56) and the inner opening 102 (adjacent to the combustion chamber 38) are substantially equal in size. As described above, the film hole 64 may provide a path through which a portion 53 of cooling air 84 flowing through the channel 56 may flow directly into the combustion chamber 38 to provide an insulting cooling film 86.

Figure 8A:
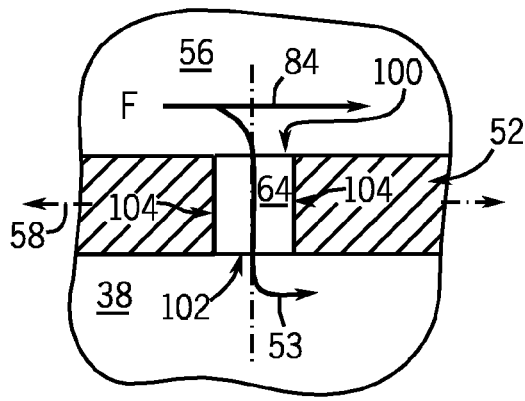
FIGS. 8A-8D are partial cross-sectional side views illustrating configurations of holes within a cooling channel of the downstream end portion of the combustor liner, taken within line 8-8 as shown in FIG. 6, in accordance with embodiments of the present technique.
Figure 8B:
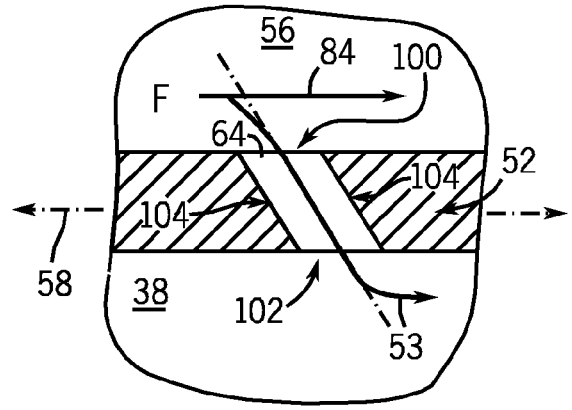

FIG. 8B shows an alternate embodiment of the film hole 64 in which the edges 104 are parallel to each other, but are angled with respect to the longitudinal axis 58 of the liner 34. In other words, the edges 104 of the film hole 64 may define a straight cylindrical passage with an angle between approximately 0 and 90 degrees, 30 and 60 degrees, or about 45 degrees relative to the inner and outer surfaces of the liner 34. Thus, the outer opening 100 and the inner opening 102 are also substantially equal in size, but the path through which the portion of air 53 flows into the combustion chamber 38 may be angled based upon the angle of the edges 104.

Figure 8C:
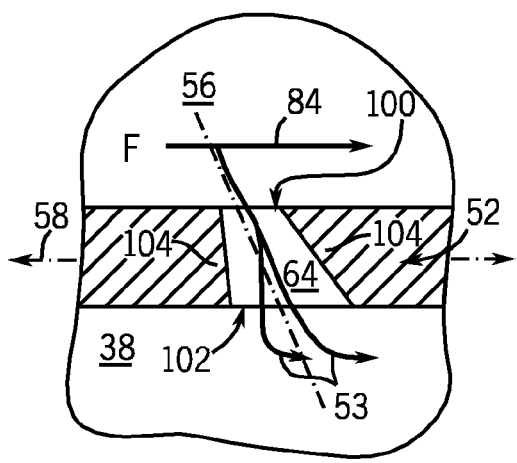

FIG. 8C shows a further embodiment in which the film hole 64 is tapered, such that the outer opening 100 is smaller relative to the inner opening 102. In other words, the edges 104 of the film hole 64 may define a diverging passage, e.g., generally conical shaped, from the inner surface (e.g., along cooling channel 56) to the outer surface (e.g., in combustion chamber 38). Furthermore, a centerline of the film hole 64 may have an angle between approximately 0 and 90 degrees, 30 and 60 degrees, or about 45 or 90 degrees relative to the inner and outer surfaces of the liner 34.

Figure 8D:
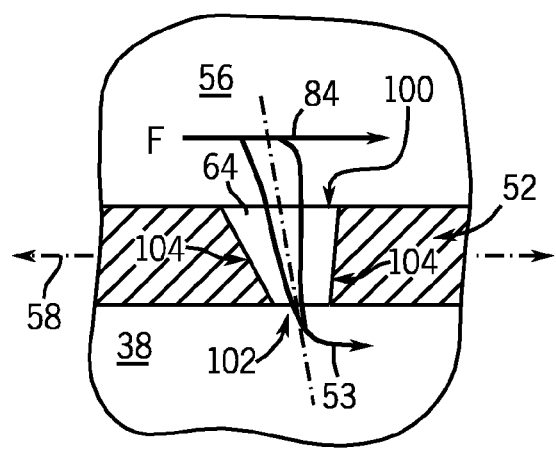

FIG. 8D shows yet another embodiment in which the film hole 64 is tapered, such that the outer opening 100 is larger relative to the inner opening 102. In other words, the edges 104 of the film hole 64 may define a converging passage, e.g., generally conical shaped, from the inner surface (e.g., along cooling channel 56) to the outer surface (e.g., in combustion chamber 38). Furthermore, a centerline of the film hole 64 may have an angle between approximately 0 and 90 degrees, 30 and 60 degrees, or about 45 or 90 degrees relative to the inner and outer surfaces of the liner 34.

As mentioned above, the diameters of the film holes 64 may be at least less than approximately 0.01, 0.02, 0.03, 0.04, 0.05, 0.06, 0.07, 0.08, 0.09, or 0.10 inches. In other embodiments, the film holes 64 may be less than 0.01 inches or greater than 0.10 inches. Further, while the film holes 64 depicted in FIGS. 8A-8D are shown as being generally circular in shape, it should be appreciated that in other embodiments, the film holes 62 may be square-shaped, rectangular shaped, oval-shaped, or any other type of suitable geometric shape, and may be formed using any suitable technique, such as laser drilling. Still further, it should be understood that the various embodiments of the film holes 64 depicted herein may be similarly applied in forming the bypass openings 41 located upstream from the downstream end portion 52.

Figure 9:
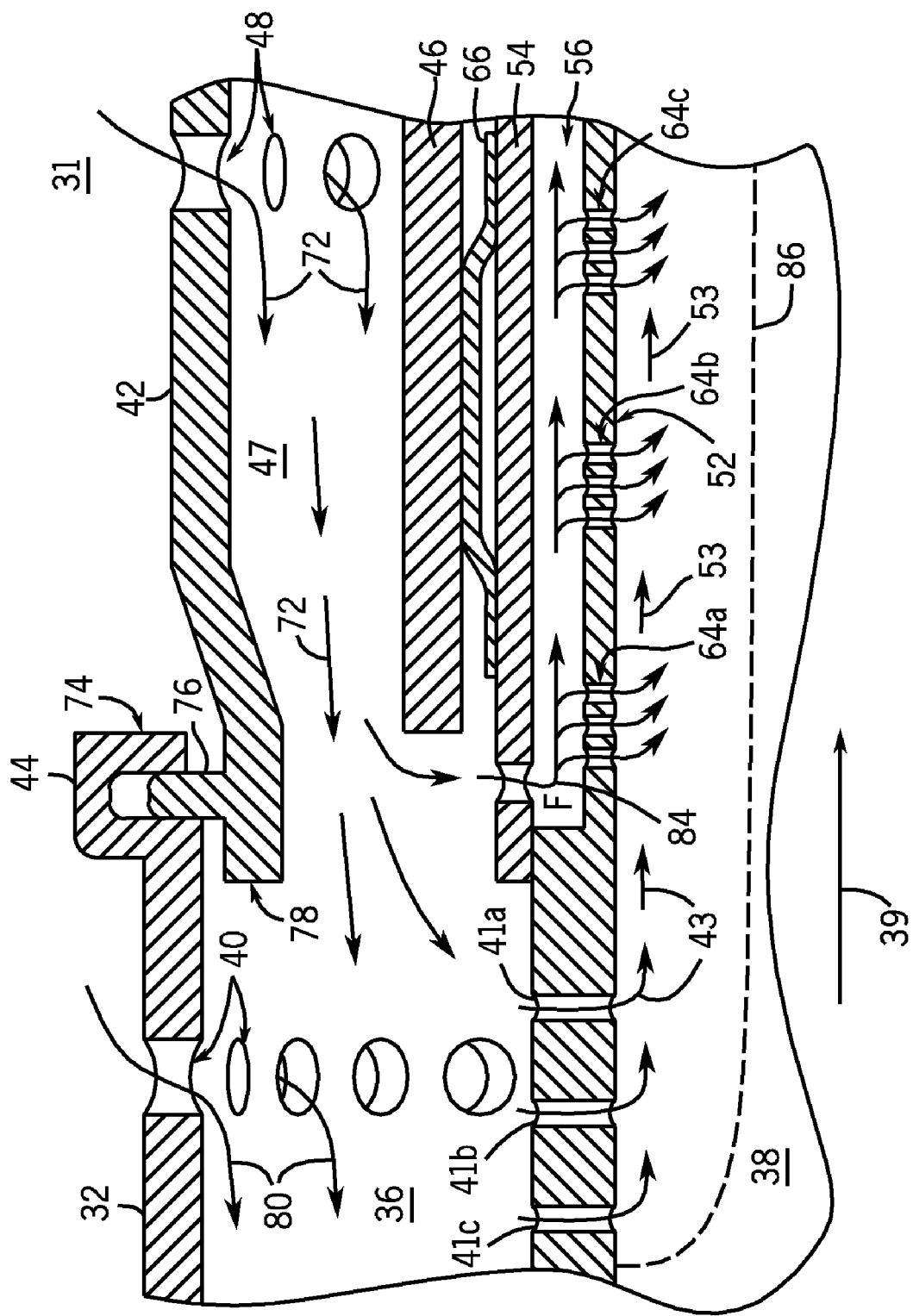
FIG. 9 is a partial cross-sectional side view of the downstream end portion of the combustor liner, taken within line 6-6 as shown in FIG. 3, in accordance with a further embodiment of the present technique.

FIG. 9 shows a partial cross-sectional side view of the combustor 16 within the circular region defined by the arcuate line 6-6 in FIG. 3, in accordance with a further embodiment of the invention. Particularly, FIG. 9 depicts an embodiment in which a plurality of sets of film holes 64 are provided and axially spaced along the axial length of the cooling channel 56. For instance, in the illustrated embodiment, the channel 56 may include a first set of film holes 64a, a second set of film holes 64b located downstream from the first set 64a, and a third set of film holes 64c located downstream from the second set 64b. Thus, as the cooling air 84 flows into the cooling channel 56 by way of the inlets 68 on the wrapper 54, portions 53 of the cooling air 84 may flow through each set of film holes 64a, 64b, and 64c in series. As will be appreciated, this arrangement may not only increases the amount of air 53 supplied to the combustion chamber 38, but also distribute the air 53 more evenly across the inner surface of the downstream end portion 52, thus providing a more uniform cooling film 86 for insulating the liner 34.

Additionally, FIG. 9 also illustrates the use of multiple sets of bypass openings 41. For instance, referring back to the embodiment shown in FIGS. 4 and 5, a single set of bypass openings 41 disposed circumferentially about the liner 34 is illustrated. In FIG. 9, three such sets of axially spaced bypass openings, referred to here by reference numbers 41a, 41b, and 41c, may be utilized in cooling the liner 34. That is, each of the bypass openings shown in the cross-sectional view of FIG. 9 may correspond to a respective set of bypass openings arranged circumferentially about the liner 34. A portion of air 43 from the annular passage 36 may flow into each of the bypass openings 41a, 41b, and 41c into the combustion chamber 38. As discussed above, this air flow 43 may provide an additional cooling film, or may contribute to the cooling film 86 that is supplied via the air flow 53 through the film holes 64a, 64b, and 64c. As will be appreciated, the use of multiple sets of bypass openings 41a, 41b, and 41c may further increase the area and uniformity of the cooling film 86, thus further improving the insulation of the liner 34 from the combustion gases within the chamber 38.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
    a turbine engine comprising:
        a combustor comprising a hollow wall having a sleeve disposed about a combustor liner, wherein the combustor liner comprises an inner surface facing inwardly toward a combustion chamber and a plurality of axial cooling channels arranged circumferentially about a downstream end portion, wherein the plurality of axial cooling channels are defined by alternating axial grooves and axial protrusions about a circumference of the combustor liner;
        a first air flow path in a first direction through the hollow wall, wherein the first air flow path comprises a bypass opening extending through the combustor liner to the inner surface; and
        a second air flow path in a second direction opposite the first direction through the hollow wall, wherein the second air flow path comprises one or more film holes extending radially through the alternating axial grooves of the combustor liner to the inner surface, the one or more film holes are arranged in a series of groups wherein the one or more film holes of each group of the series of groups is spaced together along each of the alternating axial grooves closer than spacing between each group, and the one or more film holes are configured to supply a cooling film to a downstream end portion of the combustor liner.

2. The system of claim 1, wherein the second air flow path is defined by passages formed by the plurality of axial cooling channels on the downstream end portion of the combustor liner and an inner surface of a wrapper coaxially disposed generally about the downstream end portion.

3. The system of claim 2, wherein the wrapper comprises one or more radial openings configured to supply a portion of an air flow along the first air flow path into the plurality of axial cooling channels.

4. The system of claim 3, wherein wherein another portion of the air flow supplied to the plurality of axial cooling channels flows through the one or more film holes arranged in the series of groups to provide the cooling film on the inner surface of the combustor liner at the downstream end portion.

5. The system of claim 1, wherein the first air flow path is at least partially defined by a first passage between a transition piece and a transition sleeve that surrounds the transition piece.

6. The system of claim 5, wherein the first passage is fluidly coupled to a second passage between the combustor liner and the sleeve, wherein the second passage is upstream from the first passage relative to a flow direction of combustion gases within the combustor liner.

7. The system of claim 6, wherein the first passage comprises a plurality of inlets to receive a first portion of air from a compressor, wherein the first portion of air is discharged from the first passage into the second passage as the first portion of air flows along the first air flow path in the first direction.

8. The system of claim 7, wherein the second passage comprises a plurality of inlets to receive a second portion of air from the compressor, wherein the second portion of air and the first portion of air discharged from the first passage flow through the second passage in the first direction.

9. The system of claim 8, wherein the turbine engine comprises one or more fuel nozzles, wherein the fuel nozzles receive the air flowing in the first direction through the annular passage and mix the air with a fuel, and wherein a resulting air-fuel mixture is distributed into the combustor liner for combustion.

10. The system of claim 2, wherein the plurality of axial cooling channels comprises a plurality of surface features disposed on a surface of the plurality of axial cooling channels, wherein the plurality of surface features are configured to enhance the cooling of the combustor liner.

11. A system comprising:
    a turbine combustor liner comprising:
        a plurality of axial cooling channels defined by alternating axial grooves and axial protrusions about a circumference of the turbine combustor liner, and
        an inner surface facing inwardly towards a combustion chamber,
        wherein the plurality of axial cooling channels are arranged circumferentially about a downstream end portion relative to a downstream direction of combustion along a longitudinal axis of the turbine combustor liner, wherein the turbine combustor liner comprises an inner surface facing inwardly toward a combustion chamber, each of the plurality of axial cooling channels comprises one or more film holes extending radially through the alternating axial grooves into an interior of the turbine combustor liner, the one or more film holes are configured to supply a cooling film to the inner surface of the turbine combustor liner at the downstream end portion, and the one or more film holes are arranged in a series of groups wherein the one or more film holes of each group of the series of groups is spaced together along each of the alternating axial grooves closer than spacing between each group.

12. The system of claim 11, wherein an interior of the turbine combustor liner has a combustion path with a flow of combustion gases in the downstream direction, an exterior of the turbine combustor liner has a first air path with an upstream direction of flow opposite to the downstream direction, and the exterior of the turbine combustor liner has the plurality of cooling channels with a second air path in the downstream direction.

13. The system of claim 12, comprising a first flow sleeve disposed concentrically about the turbine combustor liner to define a first hollow wall, and a second flow sleeve disposed concentrically about a transition piece to define a second hollow wall, wherein the first and second hollow walls are coupled to one another at the downstream end portion, the first and second hollow walls define the first air path with the upstream direction, and the second air path in the downstream direction is disposed radially between the plurality of cooling channels and the transition piece.

14. The system of claim 11, wherein the one or more film holes extend radially through the alternating axial grooves at an angle of approximately 90 degrees.

15. The system of claim 11, wherein the one or more film holes extend radially through the alternating axial grooves at an angle between approximately 30 to 60 degrees.

16. The system of claim 11, wherein each film hole of the one or more film holes has a geometry that converges or diverges through one of the alternating axial grooves into the interior of the turbine combustor liner.

17. The system of claim 15, wherein the geometry comprises a conical shaped passage.

18. The system of claim 11, wherein an axial length of the downstream end portion is less than or equal to approximately 20 percent of a total axial length of the turbine combustor liner, an axial channel length of each of the plurality of cooling channels is less than or equal to the axial length of the downstream end portion, and the cooling channels have a depth of approximately 0.05 to 0.30 inches and a width of approximately 0.25 to 1.0 inches.

19. The system of claim 11, wherein the turbine combustor liner comprises one or more bypass openings extending through the turbine combustor liner to the inner surface.

20. The system of claim 11, wherein each channel of the plurality of axial cooling channels comprises a plurality of surface features disposed on a surface of the channel, wherein the plurality of surface features are configured to enhance the cooling of the turbine combustor liner.

21. A system comprising:
a turbine engine comprising:
one or more fuel nozzles; and
a combustor comprising:
a flow sleeve; and
a combustor liner surrounded by the flow sleeve and defining a flow path therebetween configured to receive an air flow in a first direction towards the one or more fuel nozzles, wherein the turbine combustor liner comprises an inner surface facing inwardly toward a combustion chamber and the combustor liner comprises a plurality of axial cooling channels arranged circumferentially about a downstream end portion of the combustor liner;
wherein each of the plurality of axial cooling channels is defined by alternating axial grooves and axial protrusions about a circumference of the turbine combustor liner, each of the plurality of axial cooling channels comprises one or more film holes extending radially through the combustor liner to the inner surface in a series of groups wherein the one or more film holes of each group of the series of groups is spaced together along each of the alternating axial grooves closer than spacing between each group, and wherein each of the plurality of cooling channels is configured to receive a portion of the air flow from the flow path, direct a first portion of the received air along the axial length of the cooling channel in a second direction away from the one or more fuel nozzles, and direct a second portion of the received air through the one or more film holes to supply a cooling film to the inner surface of the combustor liner at the downstream end portion.

22. The system of claim 21, wherein the combustor liner comprises one or more bypass openings extending through the downstream end portion of the combustor liner to the inner surface at an offset from the plurality of axial cooling channels, and the one or more bypass openings are configured to direct a third portion of the received air to supply a cooling film to the inner surface of the combustor liner.

23. The system of claim 21, wherein each channel of the plurality of axial cooling channels comprises a plurality of surface features disposed on a surface of the channel, wherein the plurality of surface features are configured to enhance the cooling of the combustor liner.

* * * * *